United States Patent [19]
Powell et al.

[11] Patent Number: 5,895,918
[45] Date of Patent: Apr. 20, 1999

[54] APPARATUS FOR AND METHOD OF PERFORMING SPECTROSCOPIC ANALYSIS ON AN ARTICLE

[75] Inventors: George Louis Powell, Oak Ridge; Russell Louis Hallman, Jr., Knoxville, both of Tenn.

[73] Assignee: Lockhead Martin Energy Systems, Inc., Oak Ridge, Tenn.

[21] Appl. No.: 09/060,909

[22] Filed: Apr. 15, 1998

[51] Int. Cl.$^6$ .................................................. G01N 21/35
[52] U.S. Cl. ...................... 250/339.08; 356/51; 356/326; 250/339.11; 250/341.8
[58] Field of Search ........................... 356/51, 319, 323, 356/325, 326, 328; 250/339.06, 339.07, 339.08, 339.11, 341.8

[56] References Cited

U.S. PATENT DOCUMENTS

| | | | |
|---|---|---|---|
| 4,303,859 | 12/1981 | McCue | 250/341.8 |
| 5,088,821 | 2/1992 | Milosevic | 256/319 |

OTHER PUBLICATIONS

Spectroscopic Characterization and Pinch Welding of Contaminated Tubing—R. W. Bradshaw, D. K. Otteson, L. R. Thorne, A. L. Newmann, L. N. Tallerico; Sandia National Laboratories, Printed Dec. 1987; umlimited release—reprinted Oct. 1992.

The Detection of Contaminants in Narrow–Bore Tubing By Infrared Reflection Specroscopy—D. K. Ottesen, L. R. Thorne, and R. W. Bradshaw; Sandia National Laboratories, Printed Jun. 1986; unlimited release—reprinted Oct. 1992.

The Spectropus™ System: Remote Sampling Accessories For Reflectance, Emission, and Transmission Analysis Using Fourier Transform Infrared Spectroscopy—G. L. Powell, M. Milosevic, J. Lucania, and N. J. Harrick—Applied Spectroscopy, vol. 46, No. 1, 1992.

*Primary Examiner*—F. L. Evans
*Attorney, Agent, or Firm*—Hardaway Law Firm, P.A.

[57] ABSTRACT

An apparatus for and method of analyzing an article having an entrance and an exit in communication with the entrance. The apparatus comprises: a spectrometer having an emission source with a focal point; a plurality of mirrors; and a detector connected to the spectroscope. The emission source is positioned so that its focal point is substantially coextensive with the entrance of the article. The mirrors comprise: a first mirror positionable adjacent the exit of the article and a second mirror positioned relative to the other of said plurality of mirrors. The first mirror receives scattered emissions exiting the article and substantially collimates the scattered emissions. The second mirror substantially focuses the collimated emissions into a focused emission. The detector receives the focused emission from the mirrors.

23 Claims, 4 Drawing Sheets

1

APPARATUS FOR AND METHOD OF PERFORMING SPECTROSCOPIC ANALYSIS ON AN ARTICLE

STATEMENT AS TO RIGHTS TO INVENTIONS MADE UNDER FEDERALLY SPONSORED RESEARCH AND DEVELOPMENT

The U.S. Government has rights in this invention pursuant to contract number DE-AC05-84OR21400 between the Department of Energy and Lockheed Martin Energy Systems, Incorporated.

BACKGROUND OF THE INVENTION

The present invention relates generally to an apparatus for and method of performing spectroscopic analysis on an article. Specifically, the present invention is directed to an apparatus for and method of performing Fourier transform infra-red (FTIR) spectroscopy on non-planar articles.

The analysis of an article serves a myriad of goals. Article analysis is used in, for example, quality control, defect detection, corrosion recognition and surface coating examination. Many types of articles are suitable for analysis, including, for example, medical devices, weapons, fuel injectors and various other articles of manufacture. FTIR spectroscopy is one method of analyzing such articles.

Present FTIR spectroscopy, however, cannot readily analyze non-planar articles, such as tubes or apertures. Present FTIR spectroscopy apparatuses are either: (1) limited to the analysis of planar surfaces; or (2) limited to the analysis of identical tubular articles (i.e. tubular articles with identical size, shape and orientation). Present FTIR spectroscopy apparatuses in the first category (i.e. limited to the analysis of planar surfaces) require the dissection of non-planar articles to perform such an analysis. The non-planar articles must be cut open and examined as a flat, planar surface. The dissection of the non-planar article to perform the analysis is clearly destructive testing. The article must be discarded after testing. It cannot be used again.

U.S. Pat. No. 5,088,821 to Milosevic demonstrates an FTIR spectroscopy analysis system limited to analyzing planar surfaces. The patent discloses a spectrometer 10 with at least one remote terminal 40, 60 housing a sample 43, 65. The system also utilizes radiation piping means 25, 26 to selective pipe radiation from the spectrometer to the remote terminals. FIG. 5 demonstrates a planar sample 43 in barrel ellipsoid terminal 40. FIG. 6 demonstrates a planar sample 65 in fixed angle external reflection terminal 60.

Present FTIR spectroscopy apparatuses in the second category (i.e. that allow testing of non-planar articles) have severe limitations. These apparatuses are limited to analysis of identically sized non-planar articles. The apparatuses cannot adapt to articles of varying sizes, shapes or orientations. Furthermore, the present FTIR spectroscopy apparatuses in the second category are limited to articles having a short bore and/or a small length.

The apparatuses in the second category also have problems with the attenuation of the light beam, causing a low signal-to-noise ratio. Furthermore, the apparatuses are not adapted to analyze articles in situ. The apparatuses require the removal of the article from service and the placement of the article within the light path.

Report number SAND87-8241 demonstrates an FTIR spectroscopy analysis system limited to the analysis of identical tubular articles. The report describes the analysis of stainless steel tubes (specifically tubing having a length of 25–100 mm and an inner diameter of 1 mm; and a length of 25 mm and an inner diameter of 0.7 mm) prior to a welding process. The operator places the tube in a jig mounted on a translation stage. The tube is situated between two lenses. The first lens focuses the IR beam on the entrance of the tube. The second lens collects the beam exiting the tube. The optics interface with an FTIR spectrometer to analyze the light beam.

Clearly, there is room for improvement in the art.

SUMMARY OF THE INVENTION

Therefore, it is an object of the present invention to provide an apparatus for performing spectroscopic analysis on an article.

It is a further object of the present invention to provide an apparatus for performing Fourier transform infra-red (FTIR) spectroscopy on an article.

It is a further object of the present invention to provide an apparatus for performing FTIR spectroscopy on a non-planar article.

It is a further object of the present invention to provide an apparatus for performing FTIR spectroscopy having a greater signal-to-noise ratio.

It is a further object of the present invention to provide an apparatus for performing in situ FTIR spectroscopy on an article.

It is a further object of the present invention to provide an apparatus for performing FTIR spectroscopy on articles of varying sizes, shapes and orientations.

It is a further object of the present invention to provide a portable FTIR spectroscopy apparatus.

It is a further object of the present invention to provide a method of performing spectroscopic analysis on an article.

These and other objects are achieved in one aspect of the present invention by an apparatus for analyzing an article having an entrance and an exit in communication with the entrance. The apparatus comprises: a spectrometer having an emission source with a focal point, the emission source positionable so that the focal point is substantially coextensive with the entrance of the article; a plurality of mirrors, comprising: a first mirror positionable adjacent the exit of the article, the first mirror receiving scattered emissions exiting the article and substantially collimating the scattered emissions into collimated emissions, and a second mirror positioned relative to the other mirrors, the second mirror substantially focusing the collimated emissions into a focused emission; and a detector electrically connected to the spectrometer and receiving the focused emission from the mirrors.

These and other objects are achieved in a second aspect of the present invention by an apparatus for analyzing an article in situ, the article having an entrance and an exit in communication with the entrance. The articles comprises: a spectrometer having an emission source with a focal point, the emission source positionable so that the focal point is substantially coextensive with the entrance of the article; a plurality of mirrors, comprising: a first mirror positionable adjacent the exit of the article, the first mirror receiving scattered emissions exiting the article and substantially collimating the scattered emissions into collimated emissions, and a second mirror positioned relative to the other mirrors, the second mirror substantially focusing the collimated emissions into a focused emission; and a detector electrically connected to the spectrometer and receiving the focused emission from the mirrors.

These and other objects are achieved in a third aspect of the present invention by a method of analyzing an article. The method comprises the steps of: providing an article having an entrance and an exit in communication with the entrance; providing a spectrometer having an emission source with a focal point; positioning the focal point of the emission source of the spectrometer substantially coextensive with the entrance of the article; activating the emission source of the spectrometer to transmit emissions into the article, the emissions becoming scattered emissions upon contacting the article; providing a plurality of mirrors, comprising: a first mirror positioned adjacent the exit of said article, said first mirror receiving said scattered emissions exiting said article and substantially collimating said scattered emissions into collimated emissions; and a second mirror positioned relative to the other mirrors, the second mirror substantially focusing the collimated emissions into a focused emission; providing a detector electrically connected to the spectrometer and receiving the focused emission from the mirrors; and transmitting a signal from the detector to the spectrometer.

BRIEF DESCRIPTION OF THE DRAWINGS

The features of the present invention will become apparent to those skilled in the art to which the present invention relates from reading the following specification with reference to the accompanying drawings in which.

DETAILED DESCRIPTION OF THE PREFERRED EMBODIMENTS

Figure 1:
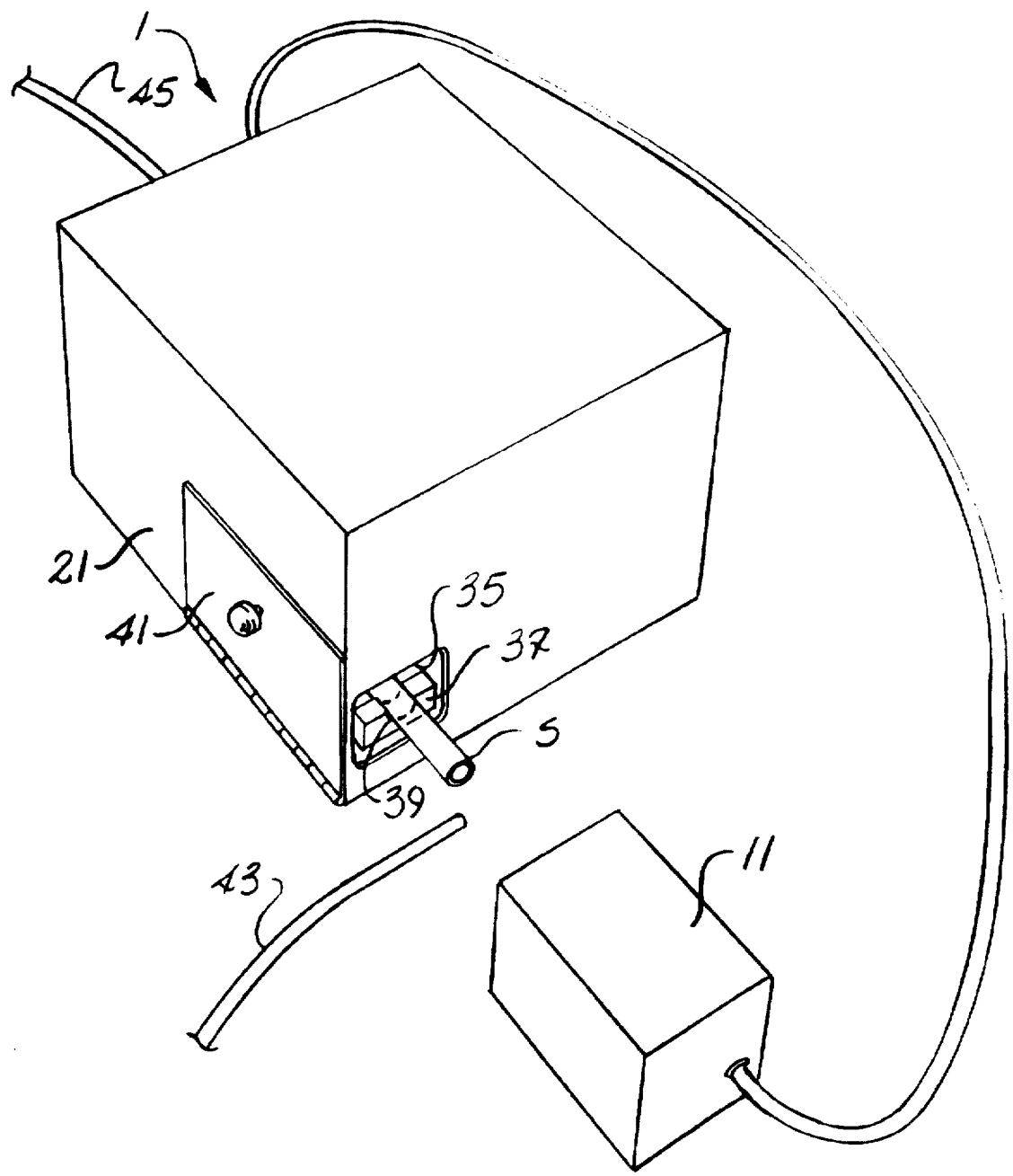
FIG. 1 is a perspective view of an alternative embodiment of an apparatus of the present invention analyzing an article.
Figure 2:
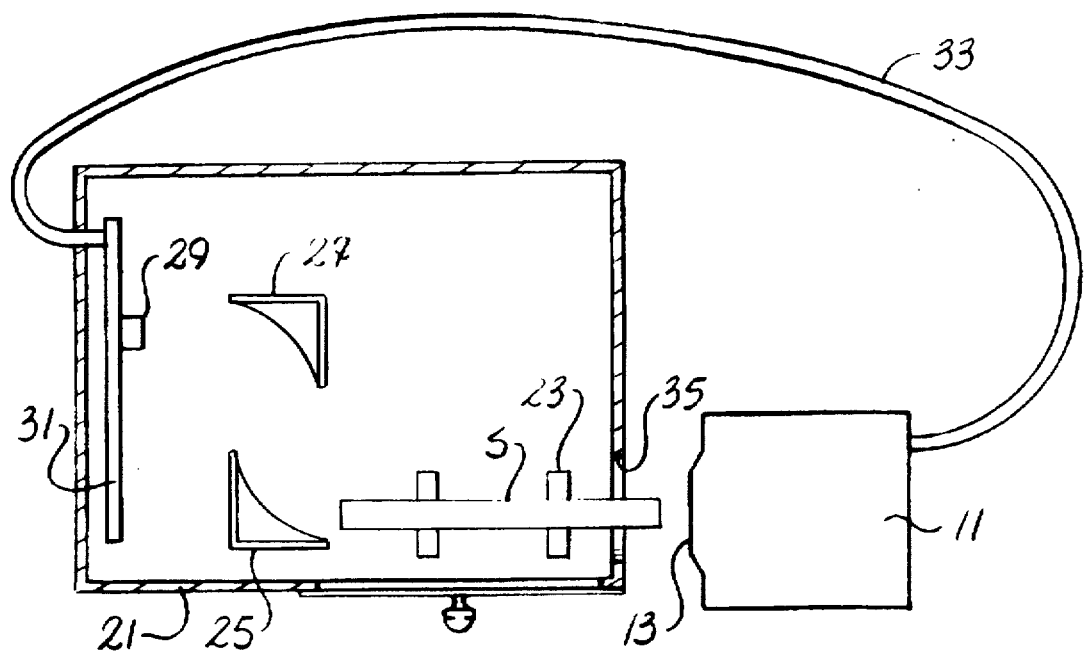
FIG. 2 is a plan view, in partial cross-section, of the alternative embodiment of the present invention shown in FIG. 1 analyzing an article.
Figure 3:
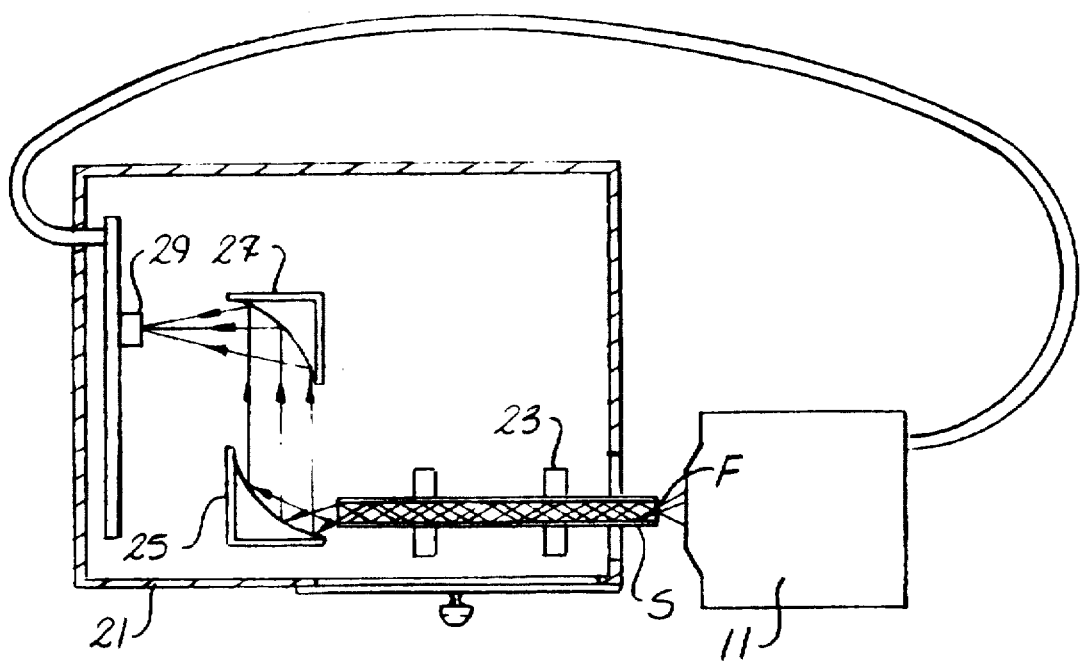
FIG. 3 is close-up, plan view, in partial cross-section, of the alternative embodiment of the present invention shown in FIG. 1 analyzing an article.
Figure 4:
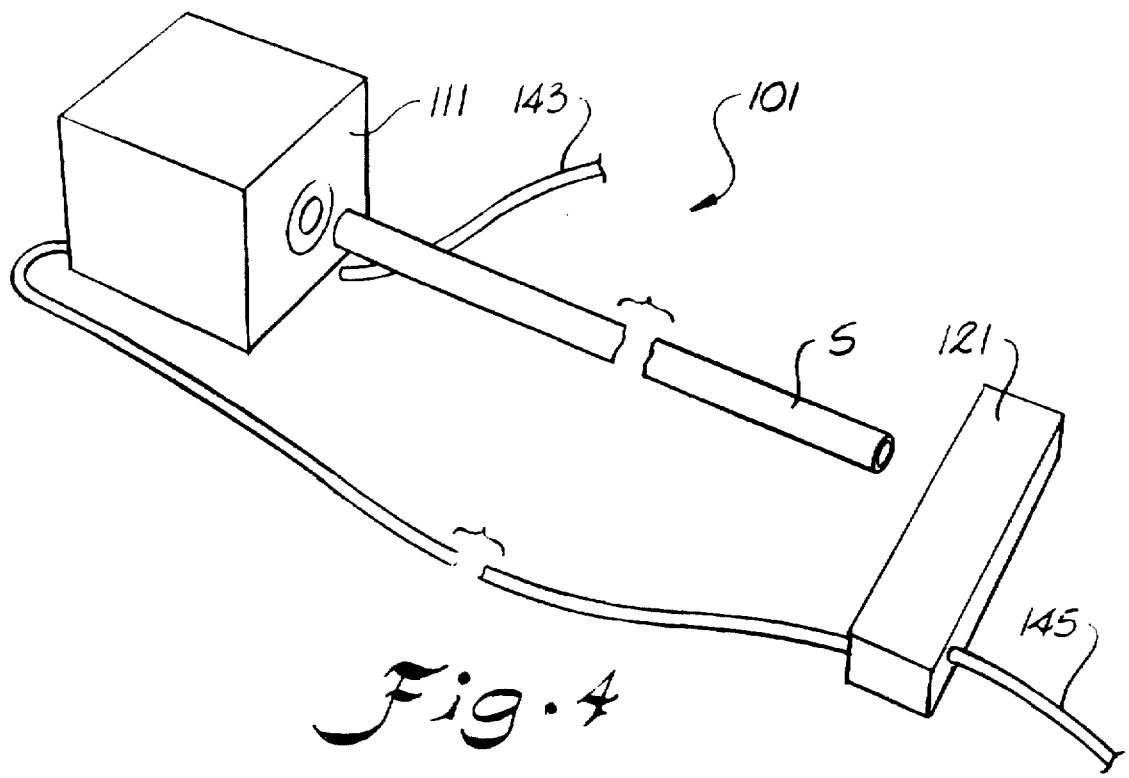
FIG. 4 is a perspective view of a second alternative embodiment of the apparatus of the present invention analyzing an article.
Figure 5:
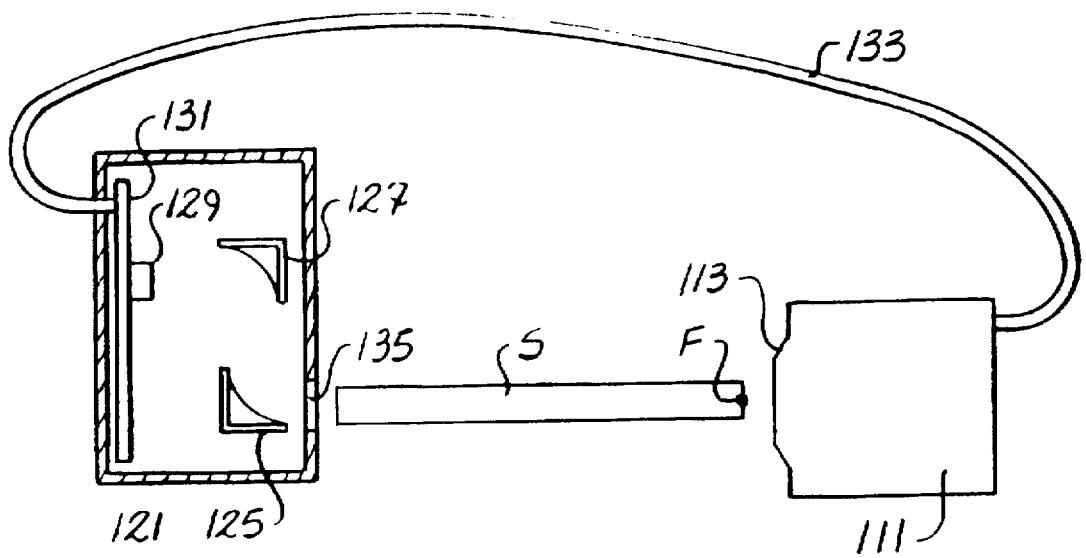
FIG. 5 is a plan view, in partial cross-section, of the alternative embodiment of the present invention shown in FIG. 4 analyzing an article.
Figure 6:
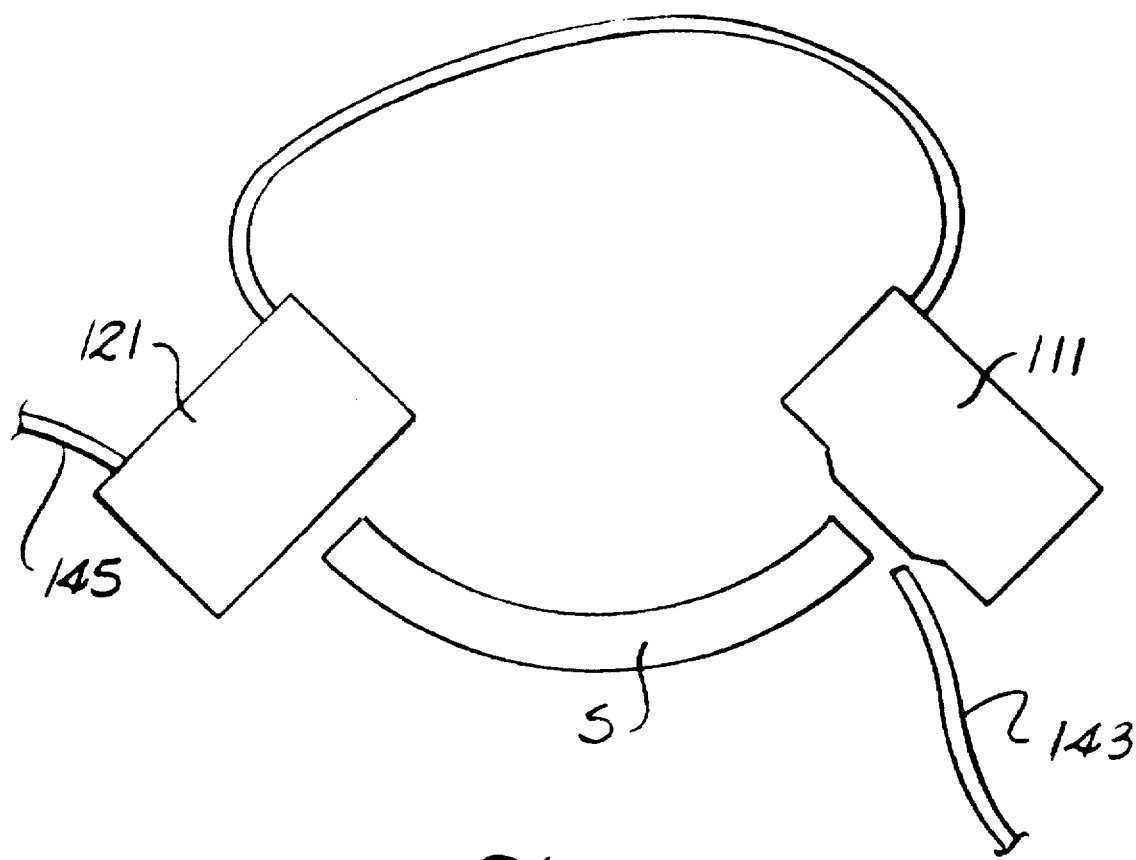
FIG. 6 is a plan view of the alternative embodiment of the present invention shown in FIG. 4 analyzing a different article.

FIGS. 1–6 demonstrate an apparatus for and method of performing spectroscopic analysis of an article. FIGS. 1–3 demonstrate an alternative embodiment of the present invention. FIGS. 4–6 demonstrate another alternative embodiment of the present invention. Each embodiment will be individually described in more detail below.

FIGS. 1–3 display the first alternative embodiment, a spectroscopic analysis system 1 of the present invention. System 1 can analyze a movable sample S. In other words, system 1 preferably does not analyze in situ.

In any embodiment of the present invention, sample S can have any shape (e.g. tubular or an aperture), size (e.g. various tubing diameters or various lengths) or orientation (e.g. straight or curved). Sample S can be formed from materials such as glass, plastic, ceramic and metal. Sample S is preferably non-planar, having an entrance and an exit in communication with the entrance. Generally speaking, sample S can be any article having an entrance aperture, an exit aperture and an inner surface therebetween. The entrance aperture and the exit aperture can have dissimilar sizes or be the same size.

System 1 utilizes a spectroscope 11, preferably a Fourier transform infra-red (FTIR) spectroscope. Applicants recognize that FTIR spectroscope model number SOC-400 manufactured by Surface Optics Corporation is suitable for use with the present invention. Other FTIR spectroscopes, however, may also be used.

The present invention does not require a detailed recitation of all of the components of spectroscope 11. The following only describes the specific components of spectroscope 11 required for an understanding of the present invention.

Spectroscope 11 has an infra-red emitter 13. Emitter 13 transmits a beam of infra-red light (see FIG. 3). The beam of light has a focal point F in front of emitter 13. The beam of light impinges on the surface of sample S as will be described in greater detail below.

System 1 also includes a housing 21. An article support assembly 23, a plurality of mirror assemblies, a detector 29, and a base 31 reside within housing 21. Article support 23 allows placement of sample S relative to emitter 13 of spectrometer 11 and the mirror assemblies. Article support assembly 23 can be any known support that accommodates samples S of varied sizes, shapes and orientations.

As seen in FIG. 1, article support assembly 23 could have, for example, a plurality of blocks 37 attached to the housing. Each block 37 has a semi-circular recess 39 therein. Recesses 39 secure sample S within article support assembly 23. Blocks 37 could also be movably positionable on housing 21 in order to accommodate non-linear samples S (e.g. curved tubes) or samples that are longer or shorter than the previous sample S. In addition, article support assembly 23 could also utilize straps, fasteners or other security devices (not shown) to retain sample S at a desired position within housing 21 and with respect to emitter 13 of spectroscope 11.

As seen in FIG. 1, a portion of sample S can extend from an aperture 35 in housing 21. The operator of system 1 inserts sample S into housing 21 by, for example, opening a hinged door 41 and placing sample S in article support assembly 23. The operator then closes door 41. Door 41 can help protect the components within housing 21 from damage.

Housing 21, with sample S secured within article support assembly 23, is positioned relative to emitter 13 of spectroscope 11. Specifically, the entrance of sample S (ie. the end of sample S extending from housing 21) is positioned so as to be coextensive with focal point F of the beam of light from emitter 13. Ideally, the center of the entrance of sample S coexists with focal point F.

The beam of light enters the entrance of sample S from emitter 13. The beam of light impinges on the inner surface of sample S, creating multiple reflections. FIG. 3 shows the multiple reflections in sample S. The multiple reflections create scattered light leaving the exit of sample S. Specifically, the collection of scatter light exiting sample S is in the form of specular reflectance spectra. Spectrometer 11 analyzes the specular reflectance spectra in a conventional manner.

A plurality of mirror assemblies also secure to housing 1. The mirror assemblies each include a mirror 25, 27 and a mirror support. Preferably mirrors 25, 27 are parabolic mirrors. First mirror 25 is positioned adjacent the exit of sample S. Specifically, first mirror 25 is coaxial with the exit of sample S in order to receive the scattered light. First mirror 25 receives the specular reflectance spectra exiting sample S and collimates the light as seen in FIG. 3. Second mirror 27 receives the collimated specular reflectance spectra from first mirror 25 and focuses the specular reflectance spectra on detector 29 as seen in FIG. 3.

The use of mirrors 25,27 provides for less attenuation of the light beam. The lower attenuation of the light beam provides detector 29 with a signal having a high signal-to-noise ratio when compared to the aforementioned conventional FTIR spectroscopy apparatuses.

As now clearly shown, spectroscopic analysis system can analyze any sized, shaped or oriented sample S. System 1 merely requires the alignment of focal point F with the entrance of sample S and the alignment of mirror 25 with the exit of sample S.

Detector 29 is secured to a base 31. Detector 29 can be any known auxiliary detector compatible with spectroscope 11. Detector 29 receives the focused specular reflectance spectra from second mirror 27. Detector 29 passes the detected light back to spectrometer 11 for analysis along a cable 33. Preferably, detector 29 transmits an analog signal to spectrometer 11.

Spectrometer 11 can detect the presence of, for example, water vapor and carbon dioxide ($CO_2$) in the air. In order to properly analyze sample S (ie. so as to avoid detecting the water vapor and carbon dioxide in the air), system 1 can include a conventional dry gas purge system. The dry gas purge system injects, for example, dry air or an inert gas such as nitrogen into sample S and into housing 21. The dry gas purge system can include a dry gas supply hose 43 connected to a source of dry gas (not shown). Supply hose 43 injects the dry gas into sample S and into housing 21. The dry gas purge system can include any supports (not shown) needed to position supply hose 43 adjacent sample S.

A suction hose 45 connects to housing 21. Suction hose 45 draws the dry gas from sample S into housing 21. Suction hose 45 evacuates the air containing water vapor and carbon dioxide, replacing it with dry gas supplied by hose 43. The presence of dry gas within sample S and within housing 21 ensures an accurate reading by spectrometer 11.

If system 1 continually analyzes samples S of the same dimensions, then spectrometer 11 and housing 21 can have the individual components of system 1 fixedly positioned relative to each other. This allows rapid evaluation of similar sized samples S without the risk of misaligning spectrometer 11 or housing 21.

On the other hand, if samples S of varying sizes, shapes and orientations are analyzed, then the various components of system 1 should be movable. For example, if samples S of differing lengths are analyzed, then article support assembly 23 could be adjustable within housing 21 to accommodate samples S of varied lengths. Consequently, the mirror assemblies should also be movable within housing 21 so that mirror 25 is positioned adjacent the exit of sample S.

The same adjustability of the individual components also allows analysis of a curved sample. FIG. 6 shows a curved article S in use with the second alternative embodiment of the present invention. In order to accommodate curved samples S, article support 23 could be adjustably positioned within housing 21 relative to the radius of curvature of the sample S. Consequently, the mirror assemblies must also be movable within housing 21 so that mirror 25 is positioned adjacent the exit of curved sample S.

FIGS. 4 and 5 display another alternative embodiment of the present invention. Features common to both embodiments will utilize the same reference character, except for a change in the hundred digit.

Spectroscopic analysis system 101 of the present invention can analyze a sample S in situ or a movable sample S. In other words, system 101 can analyze sample S without dismantling the apparatus on which sample S resides.

System 101 utilizes a spectroscope 111, preferably a Fourier transform infra-red (FTIR) spectroscope. Spectroscope 111 has an infra-red emitter 113, which transmits a beam of infra-red light. The beam of light has a focal point F in front of emitter 113.

Since sample S is in situ, spectroscope 111 must be maneuvered to a position adjacent the entrance of sample S. Specifically, spectroscope 111 must be positioned such that focal point F of the beam of light from emitter 113 is coextensive with the entrance of sample S. Ideally, the center of the entrance of sample S coexists with focal point F.

The beam of light enters the entrance of sample S from emitter 113. The beam of light impinges on the inner surface of sample S, creating multiple reflections. The multiple reflections create scattered light leaving the exit of sample S. Specifically, the scattered light is in the form of specular reflectance spectra. Spectrometer 111 analyzes the specular reflectance spectra in a conventional manner.

System 101 also includes a housing 121. A plurality of mirror assemblies, a detector 129, and a base 131 reside within housing 121. Housing 121 has an aperture 135 therein to allow the specular reflectance spectra to enter housing 121 when positioned properly.

A plurality of mirror assemblies secure to housing 121. The mirror assemblies each include a mirror 125, 127 and a mirror support. Preferably mirrors 125, 127 are parabolic mirrors. First mirror 125 is positioned within housing 121 adjacent aperture 135. Provided housing 121 is positioned properly, first mirror 125 receives the specular reflectance spectra exiting sample S and collimates the light. Second mirror 127 receives the collimated specular reflectance spectra from first mirror 125 and focuses the specular reflectance spectra on detector 129. Since the entire housing 121 is positioned relative to sample S in situ, the mirror assemblies can be fixedly secured to housing 121.

Detector 129 is secured to base 131. Detector 129 can be any known auxiliary detector compatible with spectroscope 111. Detector 129 receives the focused specular reflectance spectra from second mirror 127. Detector 129 passes the detected light back to spectrometer 111 for analysis along a cable 133. Preferably, detector 129 transmits an analog signal to spectrometer 111.

In order for detector 129 to receive the light exiting from sample S, housing 121 must be properly positioned relative to the exit of sample S. Specifically, housing 121 must be positioned adjacent the exit of sample S such that the scatter light exiting from sample S enters housing 121 and first mirror 125. For the tubular sample S as seen in FIG. 4, housing 121 must be positioned such that first mirror 125 and aperture 135 are coaxial with sample S. For the non-linear sample S in FIG. 6, housing 121 must also be positioned such that first mirror 125 and aperture 135 are coaxial with the exit of sample S.

Spectrometer 111 can detect the presence of, for example, water vapor and carbon dioxide ($CO_2$) in the air. In order to properly analyze sample S (i.e. so as to avoid detecting the water vapor and carbon dioxide in the air), system 101 can include a conventional dry gas purge system. The dry gas purge system injects, for example, dry air or an inert gas such as nitrogen into sample S and into housing 121. The dry gas purge system can include a dry gas supply hose 143 connected to a source of dry gas (not shown). Supply hose 143 can inject the dry gas into sample S and into housing 121. The dry gas purge system can include any supports (not shown) needed to position supply hose 143 adjacent sample S.

A suction hose 145 connects to housing 121. Suction hose 145 draws the dry gas from sample S into housing 121. Suction hose 145 evacuates the air containing water vapor and carbon dioxide, replacing it with dry gas supplied by hose 143. The presence of dry gas within sample S and within housing 121 ensures an accurate reading by spectrometer 111.

Applicants understand that many other variations are apparent to one of ordinary skill in the art from a reading of the above specification. Such variations are within the spirit and scope of the instant invention as defined by the following appended claims.

We claim:

1. An apparatus for analyzing an article having an entrance and an exit in communication with the entrance, comprising:
    a spectrometer having an emission source with a focal point, said emission source positionable so that said focal point is substantially coextensive with the entrance of the article;
    a plurality of mirrors, comprising:
        a first mirror positionable adjacent the exit of the article, said first mirror receiving scattered emissions exiting the article and substantially collimating said scattered emissions into collimated emissions; and
        a second mirror positioned relative to the other of said plurality of mirrors, said second mirror substantially focusing said collimated emissions into a focused emission; and
    a detector electrically connected to said spectrometer and receiving said focused emission from said plurality of mirrors.

2. The apparatus for analyzing an article as recited in claim 1, wherein said spectrometer is a Fourier transform infra-red spectrometer.

3. The apparatus for analyzing an article as recited in claim 1, further comprising an article support for positioning the article between said spectrometer and said plurality of mirrors.

4. The apparatus for analyzing an article as recited in claim 3, further comprising a housing, wherein said plurality of mirrors, said detector and said article support are disposed within said housing.

5. The apparatus for analyzing an article as recited in claim 1, further comprising a housing, wherein said plurality of mirrors and said detector are disposed within said housing.

6. The apparatus for analyzing an article as recited in claim 1, wherein said plurality of mirrors are parabolic mirrors.

7. The apparatus for analyzing an article as recited in claim 1, wherein said detector transmits an analog signal to said spectrometer.

8. An apparatus for analyzing an article in situ, the article having an entrance and an exit in communication with the entrance, comprising:
    a spectrometer having an emission source with a focal point, said emission source positionable so that said focal point is substantially coextensive with the entrance of the article;
    a plurality of mirrors, comprising:
        a first mirror positionable adjacent the exit of the article, said first mirror receiving scattered emissions exiting the article and substantially collimating said scattered emissions into collimated emissions; and
        a second mirror positioned relative to the other of said plurality of mirrors, said second mirror substantially focusing said collimated emissions into a focused emission; and
    a detector electrically connected to said spectrometer and receiving said focused emission from said plurality of mirrors.

9. The apparatus for analyzing an article as recited in claim 8, wherein said spectrometer is a Fourier transform infra-red spectrometer.

10. The apparatus for analyzing an article as recited in claim 8, further comprising a housing, wherein said plurality of mirrors and said detector are disposed within said housing.

11. The apparatus for analyzing an article as recited in claim 8, wherein said plurality of mirrors are parabolic mirrors.

12. The apparatus for analyzing an article as recited in claim 8, wherein said detector transmits an analog signal to said spectrometer.

13. A method of analyzing an article, comprising the steps of:
    providing an article having an entrance and an exit in communication with said entrance;
    providing a spectrometer having an emission source with a focal point;
    positioning said focal point of said emission source of said spectrometer substantially coextensive with said entrance of said article;
    activating said emission source of said spectrometer to transmit emissions into said article, said emissions becoming scattered emissions upon contacting said article;
    providing a plurality of mirrors, comprising:
        a first mirror positioned adjacent said exit of said article, said first mirror receiving said scattered emissions exiting said article and substantially collimating said scattered emissions into collimated emissions; and
        a second mirror positioned relative to the other of said plurality of mirrors, said second mirror substantially focusing said collimated emissions into a focused emission;
    providing a detector electrically connected to said spectrometer and receiving said focused emission from said plurality of mirrors; and
    transmitting a signal from said detector to said spectrometer.

14. The method of analyzing an article as recited in claim 13, wherein said spectrometer providing step comprises providing a Fourier transform infra-red spectrometer.

15. The method of analyzing an article as recited in claim 13, further comprising the step of providing an article support for positioning the article between said spectrometer and said plurality of mirrors.

16. The method of analyzing an article as recited in claim 15, further comprising the step of providing a housing, wherein said plurality of mirrors, said detector and said article support are disposed within said housing.

17. The method of analyzing an article as recited in claim 13 further comprising the step of providing a housing, wherein said plurality of mirrors and said detector are disposed within said housing.

18. The method of analyzing an article as recited in claim 13, wherein said mirror providing step comprises providing a plurality of parabolic mirrors.

19. The method of analyzing an article as recited in claim 13, wherein said transmitting step comprises the step of transmitting an analog signal to said spectrometer.

20. The method of analyzing an article as recited in claim 13, wherein said article providing step comprises the step of providing a non-planar article.

21. The method of analyzing an article as recited in claim 20, wherein said non-planar article providing step comprises the step of providing one of a tubular article and an article having a hole therein.

22. The method of analyzing an article as recited in claim 13, wherein said article providing step comprises the step of providing an article in situ.

23. The method of analyzing an article as recited in claim 13, wherein said emission source activating step comprises the step of activating said emission source of said spectrometer to transmit emissions into said article, said emissions becoming specular reflectance spectra upon contacting said article.

* * * * *

UNITED STATES PATENT AND TRADEMARK OFFICE
CERTIFICATE OF CORRECTION

PATENT NO. : 5,895,918
DATED : April 20, 1999
INVENTOR(S) : George Lewis Powell, et. al.

It is certified that error appears in the above-identified patent and that said Letters Patent is hereby corrected as shown below:

Title page, item [73], Assignee: should read as following:

"Lockheed Martin Energy Systems, Inc.", instead of "Lockhead Martin Energy Systems, Inc."

Signed and Sealed this

Twenty-fourth Day of August, 1999

Attest:

Q. TODD DICKINSON

*Attesting Officer*  *Acting Commissioner of Patents and Trademarks*